United States Patent [19]

Ohnishi et al.

[11] Patent Number: 5,064,572
[45] Date of Patent: Nov. 12, 1991

[54] POLY (LONG-CHAIN NUCLEAR SUBSTITUTED PHENYLENE VINYLENE), PRECURSOR THEREFOR AND HIGHLY CONDUCTIVE COMPOSITION THEREOF

[75] Inventors: Toshihiro Ohnishi, Itami; Takanobu Noguchi, Otsu; Tsuyoshi Nakano, Ibaraki, all of Japan

[73] Assignee: Agency of Industrial Science and Technology, Tokyo, Japan

[21] Appl. No.: 608,620

[22] Filed: Nov. 6, 1990

Related U.S. Application Data

[63] Continuation of Ser. No. 244,267, Sep. 15, 1988, abandoned.

[30] Foreign Application Priority Data

Sep. 22, 1987 [JP] Japan .................................. 62-236251
Apr. 4, 1988 [JP] Japan .................................. 63-81339

[51] Int. Cl.$^5$ .......................... H01B 1/00; H01B 1/06
[52] U.S. Cl. ...................................... 252/500; 252/512; 252/518; 252/519; 252/520; 526/270; 524/80; 524/401; 524/439
[58] Field of Search ................ 252/500, 518; 526/270, 526/257; 528/417; 524/80, 401, 439, 408, 413, 414, 417, 404, 418, 434, 435, 236

[56] References Cited

U.S. PATENT DOCUMENTS

| | | |
|---|---|---|
| 3,532,643 | 10/1970 | Wessling et al. |
| 3,706,677 | 12/1972 | Wessling et al. |
| 4,528,118 | 7/1985 | Murase et al. |
| 4,626,588 | 12/1986 | Murase et al. |
| 4,808,681 | 2/1989 | Harper et al. .................... 526/270 |

*Primary Examiner*—Josephine Barr
*Attorney, Agent, or Firm*—Stevens, Davis, Miller & Mosher

[57] ABSTRACT

The present invention provides a poly(long-chain nuclear substituted-p-phenylene vinylene) represented by the following formula:

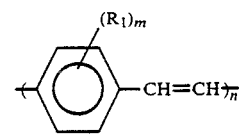

(wherein $R_1$ represents a hydrocarbon group of 7-20 carbon atoms or an alkoxy group of 7-20 carbon atoms, n represents an integer of 5 or more and m represents an integer of 1 or 2) and a highly conductive composition comprising said polymer and a dopant as essential components.

12 Claims, No Drawings

POLY (LONG-CHAIN NUCLEAR SUBSTITUTED PHENYLENE VINYLENE), PRECURSOR THEREFOR AND HIGHLY CONDUCTIVE COMPOSITION THEREOF

This application is a continuation of application Ser. No. 244,267, filed Sept. 15, 1988, now abandoned.

BACKGROUND OF THE INVENTION

1. FIELD OF THE INVENTION

The present invention relates to a poly(long-chain substituted phenylene vinylene), a precursor therefor and a conductive composition comprising poly(long-chain substituted phenylene vinylene) and a dopant.

2. DESCRIPTION OF THE PRIOR ART

Conjugated polymers are rigid polymers and are generally insoluble and infusible and poor in processability. As an approach to improve processability, there has been proposed a process of using a soluble precursor polymer (U.S. Pat. No. 4528118), according to which a stretched film of poly(p-phenylene vinylene) is obtained by subjecting p-xylylene-bis(sulfonium salt) to condensation polymerization, subjecting this polymeric sulfonium salt to casting and then subjecting the resulting cast film to elimination of the sulfonium salt group and then to thermal stretching. A stretched film of substituted poly(p-phenylene vinylene) is also known.

However, conjugated polymers obtained from precursor, being rigid, are insoluble and infusible and thus the conjugated polymers are difficult to mold. Further, water-soluble sulfonium salt precursor polymer is a polyelectrolyte and its aqueous solution is high in viscosity. Therefore, for easy handling, an aqueous solution of low concentration must be used and a special means is required for molding and thus, it has not been sufficiently high in processability in practical use.

SUMMARY OF THE INVENTION

The object of the present invention is to provide (a) a conjugated polymer improved in solubility and processability or a conjugated polymer swellable or soluble in an organic solvent, (b) a highly conductive composition comprising the conjugated polymer and a dopant and (c) a precursor for the conjugated polymer.

The above object has been attained by providing a poly(long-chain nuclear substituted-p-phenylene vinylene) improved in solubility and processability and swellable or soluble in organic solvent and represented by the following formula (I):

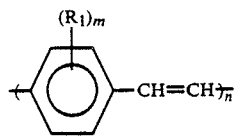

(wherein $R_1$ represents a hydrocarbon group of 7-20 carbon atoms or an alkoxy group of 7-20 carbon atoms, n represents an integer of 5 or more and m represents an integer of 1-2), a precursor therefor and a highly conductive composition comprising said polymer and a dopant.

DESCRIPTION OF THE PREFERRED EMBODIMENT

The long-chain substituent $R_1$ is a hydrocarbon group of 7-20, preferably 7-18 carbon atoms or an alkoxy group of 7-20, preferably 7-18 carbon atoms. Examples thereof are straight-chain saturated hydrocarbon groups and straight-chain saturated alkoxy groups such as n-heptyl, n-octyl, n-nonyl, n-decyl, n-lauryl, n-octadecyl, n-eicosyl, n-heptyloxy, n-octyloxy, n-nonyloxy, n-decyloxy, n-lauryloxy, n-octadecyloxy and n-eicosyloxy and straight-chain unsaturated hydrocarbon groups or straight-chain unsaturated alkoxy groups thereof. Among them, straight-chain saturated hydrocarbon groups and straight-chain saturated alkoxy groups are preferred and the latter are especially preferred. Position of substitution of $R_1$ in benzene ring is not critical, but preferably is 2- or 3-position in case of one substituent and is 2,5-position in case of 2 substituents.

Process for synthesis of the poly(long-chain nuclear substituted-p-phenylene vinylene) is not critical, but preferred are as follows.

Process by elimination of sulfonium salt group which comprises subjecting to elimination of sulfonium salt group a sulfonium salt precursor polymer represented substantially by the formula (II):

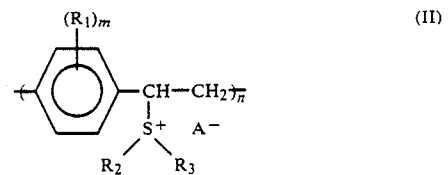

(wherein $R_1$ represents a hydrocarbon group of 7-20 carbon atoms or an alkoxy group of 7-20 carbon atoms, $R_2$ and $R_3$ each represents a hydrocarbon group of 1-10 carbon atoms, n is an integer of 5 or more, m is 1 or 2 and $A^-$ represents a counter ion).

Process by elimination of alcohol which comprises subjecting to elimination of $-OR_4$ group a precursor represented substantially by the following formula (III):

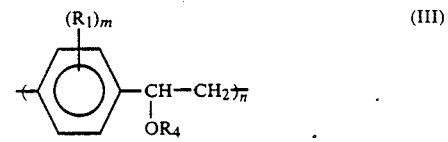

(wherein $R_1$ represents a hydrocarbon group of 7-20 carbon atoms or an alkoxy group of 7-20 carbon atoms, $R_4$ represents a hydrocarbon group of 1-7 carbon atoms, n is an integer of 5 or more and m is 1 or 2).

Process by dehydrohalogenation which comprises condensation polymerizing, by dehydrohalogenation reaction, a nuclear substituted p-xylylene dihalide represented by the following formula (IV):

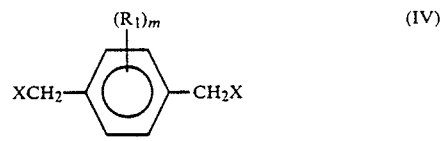

(wherein $R_1$ represents a hydrocarbon group of 7-20 carbon atoms or an alkoxy group of 7-20 carbon atoms and X represents a halogen atom).

Wittig process which comprises condensation polymerizing a diphosphonium salt represented by the formula (V):

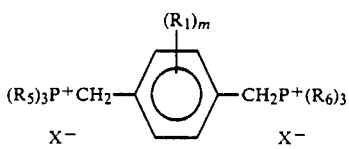

(wherein $R_1$ represents a hydrocarbon group of 7-20 carbon atoms or an alkoxy group of 7-20 carbon atoms, X represents a halogen atom and $R_5$ and $R_6$ each represents a hydrocarbon group of 3-6 carbon atoms) and a dialdehyde represented by the formula (VI):

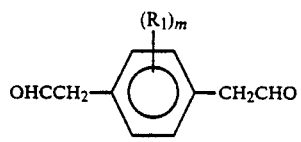

(wherein $R_1$ represents a hydrocarbon group of 7-20 carbon atoms or an alkoxy group of 7-20 carbon atoms).

Considering processability, the process via sulfonium salt polymer, the dehydrohalogenation process and the process by elimination of alcohol are more preferred.

According to the process via sulfonium salt polymer, a long-chain nuclear substituted-p-xylylenedisulfonium salt obtained by the reaction of a long-chain nuclear substituted p-xylylene dihalide with a dialkyl sulfide is condensation polymerized with an alkali in water alone or a water-soluble organic solvent such as, for example, a mixed solvent of alcohols and water to obtain the sulfonium salt polymer represented by the formula (II). This sulfonium salt polymer is subjected to elimination of sulfonium salt group to obtain the poly(long-chain nuclear substituted-p-phenylene vinylene).

Alternatively, the sulfonium salt polymer represented by the formula (II) is reacted with an alcohol ($R_4OH$), whereby the sulfonium salt group as a side chain can be substituted with alkoxy group ($R_4O-$) which comes from alcohol. The resulting poly(long-chain alkoxy nuclear-substituted-p-phenylene vinylene) precursor represented by the formula (III) is superior in stability and is easy to mold. Poly(long-chain nuclear substituted -p-phenylene vinylene) can be synthesized by subjecting said precursor to elimination of $-OR_4$ group.

The alkali used for condensation polymerization of sulfonium salt polymer is preferably a strong base which shows a pH of at least 11 in water or an organic solvent unreactive with sulfonium salt monomer such as a mixed solvent of alcohol and water. There may be used, for example, sodium hydroxide, potassium hydroxide, calcium hydroxide, quaternary ammonium salt hydroxides, sulfonium salt hydroxides and strongly basic ion exchange resins (OH type). Preferred are sodium hydroxide, potassium hydroxide and strongly basic ion exchange resins.

$R_2$ and $R_3$ in the formula (II) each represents a hydrocarbon group of 1-10 carbon atoms such as, for example, methyl, ethyl, propyl, isopropyl, n-butyl, 2-ethylhexyl, phenyl, cyclohexyl and benzyl groups. Among them, hydrocarbon groups of 1-6 carbon atoms, especially methyl and ethyl groups are preferred. As the counter ion $A^-$ in the formula (II), any ions can be used in accordance with conventional methods. For example, halogen ion, hydroxyl ion, boron tetrafluoride ion, perchlorate ion, carboxylate ion and sulfonate ion can be used and preferred are halogen ions such as chloride ion, bromide ion and iodide ion and hydroxyl ion.

The condensation polymerization reaction in the process via sulfonium salt polymer is sometimes heterogeneous because the resulting precursor polymer is susceptible to heat, light, ultraviolet ray or strongly basic condition and undergoes gradual elimination of side chain of sulfonium salt, resulting in a precursor polymer partially having conjugated structure. Therefore, the condensation polymerization reaction is preferably carried out at a relatively low temperature, that is, 50° C. or lower, further preferably 25° C. or lower, especially 5° C. or lower. Reaction time is not critical and normally 1 minute to 50 hours.

Conversion of sulfonium salt polymer to precursor polymer (III) having an alkoxy group ($-OR_4$) as a side chain can be performed by the reaction with alcohol ($R_4OH$) and the process is not critical, but in view of the sulfonium salt polymer being soluble in organic solvent, it is preferred from the point of operability that the sulfonium salt polymer is dissolved in an organic solvent and then reacted with an alcohol. In this case, the reaction does not sufficiently proceed at low temperature while at high temperature a reaction of elimination of side chain takes place besides the substitution reaction to produce conjugated polymers. This is not desired. Thus, reaction temperature is preferably 5° C. -70° C., more preferably 10° C.-50° C.

$R_4$ represents a hydrocarbon group of 1-7 carbon atoms such as, for example, methyl, ethyl, propyl, isopropyl, n-butyl, 2-ethylhexyl, phenyl, cyclohexyl and benzyl groups. Among them, hydrocarbon groups of 1-4 carbon atoms, especially methyl and ethyl groups are preferred.

Preparation of conjugated polymers by elimination of sulfonium salt group or alkoxy group ($R_4O-$) which is a side chain from salt precursor polymer (II) or (III) can be performed by a treatment, for example, with heat, light, ultraviolet ray or a strong base and heat treatment is preferred. In order to obtain a highly conductive composition, it is important to carry out the elimination of side chain from precursor polymer in an inert atmosphere. The inert atmosphere here means an atmosphere where deterioration of the polymer does not occur during treatment and it is especially necessary to prevent oxidation reaction with oxygen and air. In general, the treatment is carried out using an inert gas such as nitrogen, argon, helium or the like, and may also be carried out under vacuum or in an inert medium.

When the elimination treatment is effected with heat, heat treatment at too high temperature causes decomposition of resulting conjugated polymer while at low temperature, reaction rate is small and this is not practical. Thus, the treating temperature is normally 50° C.-400° C., preferably 50°·C.-350° C. Treating time can be suitably chosen depending on treating temperature, but industrially and practically, 1 minute to 10 hours is preferred.

According to the dehydrohalogenation process, a long-chain nuclear substituted p-xylylene dihalide is subjected to self-condensation polymerization with alkali or the like to obtain a poly(long-chain nuclear substituted p-phenylene vinylene). Solvents used for the self-condensation polymerization are preferably organic solvents which do not react with long-chain nuclear substituted p-xylylene dihalide and the alkali used, and examples thereof are alcohols, aromatic hydrocarbons and ethers. Typical examples are t-butanol, xylene, dimethyl sulfoxide and ethyl ether. The alkali used is preferably strong base which shows a pH of 11 or more in the reaction solvent and examples thereof are alkyl alkali metals and alkali metal alkoxides such as butyl lithium, lithium ethoxide and t-butoxy potassium. Halogens of long-chain nuclear substituted p-xylylene dihalide are chlorine, bromine and iodine and chlorine and bromine are especially preferred. Self-condensation polymerization temperature varies depending on reaction rate and is suitably at least 50° C. and lower than boiling point of solvent used, especially preferably 80° C.–120° C. Reaction time is not critical, but normally 1 minute to 50 hours.

According to the Wittig process, poly(long-chain nuclear substituted p-phenylene vinylene) is obtained by condensation polymerization of diphosphonium salt of long-chain nuclear substituted p-xylylene dihalide which is represented by the formula (V) and long-chain nuclear substituted p-xylylene dialdehyde represented by the formula (VI). The diphosphonium salt is obtained by reacting a long-chain nuclear substituted p-xylylene dihalide with a phosphine such as a trialkylphosphine and triphenylphosphine. The trialkylphosphine has a hydrocarbon group of 3–6 carbon atoms and triphenylphosphine is preferred. The long-chain nuclear substituted p-xylylene dihalide and the long-chain nuclear substituted p-xylylene dialdehyde may be different in their long-chain group. In an extreme case, when either one of them is unsubstituted compound, it is possible to produce an alternating copolymer of long-chain nuclear substituted p-phenylene vinylene and unsubstituted p-phenylene vinylene.

Solvents used for condensation polymerization are organic solvents which do not react with the dialdehyde, diphosphonium salt and alkali used, preferably alcohols and ethers. Examples thereof are ethanol, t-butanol, ethyl ether and tetrahydrofuran. Alkali solution used is preferably a strong base which shows a pH of at least 11 in the reaction solvent and examples thereof are alkyl alkali metals and alkali metal alkoxides such as, for example, butyl lithium and lithium ethoxide. Halogens of the long-chain p-xylylene dihalide are chlorine, bromine and iodine and chlorine and bromine are preferred.

Condensation polymerization temperature varies depending on reaction rate and is suitably at least 50° C. and lower than boiling point of solvent used, especially preferably 80° C.–120° C. Reaction time is not critical, but normally 1 minute to 50 hours.

In order to obtain poly(long-chain nuclear substituted p-phenylene vinylene) which is high in solubility and can afford high conductivity, it is preferred that it has a sufficiently high molecular weight. It is effective to use at least polymers of the formula (I) or precursor polymers of the formula (II) or (III) which have the polymerization degree n of at least 5, preferably 10–50000 and, for example, have such a high molecular weight as the polymer being eluted before the position where standard polystyrene having a molecular weight of 2800 is eluted in measurement of molecular weight by gel permeation chromatography.

Molded products of poly(long-chain nuclear substituted p-phenylene vinylene) or precursor polymer can be stretched for orientation. That is, precursor polymer obtained according to the process comprising elimination of sulfonium salt group or elimination of alcohol can be stretched for orientation and heat treated. Especially, since this precursor polymer is soluble in organic solvent, a high concentration solution of the precursor polymer can be prepared. This is more suitable to make a molded product than the conventional solution of sulfonium salt precursor polymer in water as a solvent. Furthermore, the molded product of the resulting poly(long-chain nuclear substituted p-phenylene vinylene) can be stretched by swelling in solvent or heating.

The poly(long-chain nuclear substituted p-phenylene vinylene) according to the present invention can be doped with an electron acceptor or donor (hereinafter referred to as "dopant") to obtain a highly conductive composition.

As the dopant, there may be effectively used those compounds which have been found to be effective in improving the conductivity in doping well-known electroconductive polymers such as polyacetylene and in forming an intercalated compound of graphite.

The composition of the present invention can be produced using any doping method. However, doping methods such as chemical doping, electrochemical doping, photodoping, ion implantation and the like are preferred.

Specific examples of the electron acceptor include the followings.

Halogen compounds:
Fluorine, chlorine, bromine, iodine, iodine chloride, iodine trichloride, iodine bromide Lewis acids:
Phosphorus pentafluoride, arsenic pentafluoride, antimony pentafluoride, boron trifluoride, boron trichloride, boron tribromide, sulfur trioxide Protonic acids:
Hydrogen fluoride, hydrogen chloride, nitric acid, sulfuric acid, perchloric acid, fluorosulfonic acids, chlorosulfonic acids, trifluoromethanesulfonic acid Transition metal chlorides:
Titanium tetrachloride, zirconium tetrachloride, hafnium tetrachloride, niobium pentachloride, tantalum pentachloride, molybdenum pentachloride, tungsten hexachloride, iron trichloride Organic compounds:
Tetracyanoethylene, tetracyanoquinodimethane, chloranil, dichlorodicyanobenzoquinone Specific examples of the electron donor include the followings.

Alkali metals:
Lithium, sodium, potassium, rubidium, cesium

Quaternary ammonium salts:
Tetraalkylammonium ion

The content of dopant in the composition of the present invention is determined by the type of dopant used. However, it can generally be altered as desired, depending upon the doping conditions (e.g. doping time, dopant concentration). A preferable content of dopant is ordinarily 0.01 to 2.0 moles per one repeating unit of conjugated polymer of the formula (I). When the mole number is too small, the high conductivity of composition is not attained. When the mole number is too large, the conductivity of composition tends to saturate and accordingly too large a mole number is uneconomical. Of the dopants mentioned previously, those which do not interfere with the conjugated double bonds and long-chain nuclear substituted p-phenylene group in the formula (I) are preferred because they can provide a highly conductive composition. Sulfur trioxide, sulfuric acid, iron trichloride and iodine are particularly effective dopants.

The composition of the present invention can have a high conductivity of 15 S/cm. Furthermore, the stretched composition can have further higher conductivity and besides, shows electrical anisotropy and further it can have an anisotropy of more than five times in the direction perpendicular to the direction of stretching.

In order to obtain high conductivity, it is extremely preferred to carry out molding of composition with dopant in an inert atmosphere.

The poly(long-chain nuclear substituted p-phenylene vinylene) of the present invention is a rigid conjugated polymer, but is soluble or at least swellably in organic solvent and shaping or stretching treatment can be applied to the conjugated polymer per se. Moreover, poly(long-chain nuclear substituted p-phenylene vinylene) precursor having an alkoxy group as a side chain is thermally stable, easy in handling and soluble in organic solvent and so improvement of processability and stretching of conjugated polymer can be advantageously performed. Further, highly conductive composition can be obtained by doping the polymer and the composition can be applied to electrical and electronic materials and the like utilizing the conductivity.

The following nonlimiting examples illustrate the present invention.

EXAMPLE 1

2.5 g of 2,5-dilauryloxy-p-xylylene-bis(dimethylsulfonium bromide) was dissolved in a mixed solvent of 50 ml of methanol and 5 ml of deionized water. Thereto was added dropwise a mixed solution of 3.4 ml of 1 N aqueous sodium hydroxide solution and 10 ml of methanol over a period of 15 minutes and then was added 50 ml of methanol, followed by stirring at 0° C.-5° C. for 30 minutes. The resulting polymer solution was subjected to dialysis against methanol/water mixed solvent (volume ratio 8/1) for one day using a dialysis membrane (Cellotube ®, fractionation molecular weight 8,000, a product of Union Carbide Co.) to obtain a light yellow precipitate. This precipitate was separated and dissolved in chloroform and the solution was cast and dried in nitrogen stream to obtain a precursor film. Thermal weight change of the resulting film was examined to find weight reduction only at 90° C.-100° C. and no reduction at 150° C.-160° C. Analysis of molecular species in the gas generated which was conducted by quadruple mass spectrometer gave a sharp peak at a mass number of 62 corresponding to dimethyl sulfide and thus it was confirmed that dimethyl sulfide was produced at 90° C.-100° C. and that the precursor polymer had the sulfonium group as a side chain.

This film was subjected to a stationary heat treatment at 200° C. for 30 minutes in a nitrogen atmosphere in a horizontal tubular furnace to obtain a red poly(2,5-dilauryloxy-p-phenylene vinylene) film. Elementary analysis gave C: 81.1% (81.7%), H: 11.7% (11.5%) (the parenthesized values are those obtained by calculation from structural formula), which met the structural formula. Infrared spectrum showed absorption of aliphatic hydrocarbon group at 2900 cm$^{-1}$, that of benzene ring-substituted alkoxy group at 1220 cm$^{-1}$ and that of trans-vinylene at 970 cm$^{-1}$. It was confirmed from these results that it had the structure of poly(2,5-dilauryloxy-p-phenylene vinylene).

This film was subjected to gas phase doping at room temperature according to an ordinary method, using iodine as an electron acceptor. The film showed a conductivity of 0.8 S/cm in 4 hours. Measurement of the conductivity was carried out by four-probe technique.

EXAMPLE 2

The film (2 cm length ×2 cm width) obtained in Example 1 was subjected to stretching to 4 times and stationary heat treatment at 100° C. for 30 minutes in a nitrogen atmosphere in a horizontal tubular furnace to obtain a stretched poly(2,5-dilauryloxy-p-phenylene vinylene) film.

Furthermore, the resulting film was subjected to gas phase doping at room temperature according to an ordinary method using iodine as an electron accepting compound. The film showed a conductivity of 12.6 S/cm in 1 hour.

EXAMPLE 3

9.4 g of 2,5-diheptyloxy-p-xylylene-bis(dimethylsulfonium bromide) was dissolved in a mixed solvent of 150 ml of methanol and 10 ml of deionized water. Thereto was added dropwise a mixed solution of 15 ml of 1 N aqueous sodium hydroxide solution and 70 ml of methanol over a period of 20 minutes, followed by stirring at 0° C.-5° C. for 40 minutes. The resulting polymer solution was subjected to dialysis against methanol/water mixed solvent (volume ratio 8/1) for one day using a dialysis membrane (Cellotube ®, fractionation molecular weight 8,000, a product of Union Carbide Co.) to obtain a light yellow precipitate. This precipitate was recovered by filtration and dissolved in chloroform and the solution was cast and dried in nitrogen stream to obtain a precursor film.

This film was subjected to a stationary heat treatment at 200° C. for 30 minutes in a nitrogen atmosphere in a horizontal tubular furnace to obtain a red poly(2,5-diheptyloxy-p-phenylene vinylene) film. The structure was confirmed from elementary analytical value and infrared spectrum.

This film was subjected to gas phase doping at room temperature according to an ordinary method, using iodine as an electron acceptor. The film showed a conductivity of 11.2 S/cm in 1 hour.

EXAMPLE 4

The precursor film obtained in Example 3 was subjected to stretching to 5 times simultaneously with heat treatment at 200° C. in a nitrogen atmosphere in a horizontal tubular furnace to obtain a red uniaxially stretched poly(2,5-diheptyloxy-p-phenylene vinylene) film.

The resulting film was subjected to doping with iodine. The film had a black color and showed a conductivity of 150 S/cm.

EXAMPLE 5

The solution of precursor polymer in chloroform obtained in

EXAMPLE 2 was concentrated to 3 times at 40° C. under reduced pressure. The concentrate was slowly extruded and spun into water from a nozzle having a diameter of 2 mm. The resulting filament was dried under reduced pressure and was subjected to stretching to 3 times simultaneously with heat treatment at 100° C. in a nitrogen atmosphere in a horizontal tubular furnace to obtain a red uniaxially stretched poly(2,5-diheptyloxy-p-phenylene vinylene) filament.

The resulting filament was doped in sulfuric acid. The filament had a black color and showed a conductivity of 13.1 S/cm.

EXAMPLE 6

A solution of 10.8 g of 2,5-dilauryloxy-p-xylylene dibromide dissolved in 80 g of xylene was added dropwise to a solution of 5.0 g of t-butoxy potassium dissolved in 60 g of t-butyl alcohol over a period of 30 minutes under reflux of solvent. Reaction was allowed to proceed for 7 hours under reflux to obtain a red precipitate. This precipitate was washed with water and methanol and then dried. It was confirmed by infrared absorption spectrum that said precipitate was poly(2,5-dilauryloxy-p-phenylene vinylene).

The resulting precipitate was soluble in chloroform and the solution was cast to obtain poly(2,5-dilauryloxy-p-phenylene vinylene) film.

This film was subjected to gas phase doping at room temperature according to an ordinary method using iodine as an electron acceptor. The film showed a conductivity of $9.5 \times 10^{-3}$ S/cm in 1 hour.

The resulting poly(2,5-dilauryloxy-p-phenylene vinylene) was subjected to reprecipitation with methanol from its chloroform solution to perform purification. The cast film obtained from the chloroform solution showed a conductivity of $2.5 \times 10^{-1}$ S/cm by doping with iodine.

EXAMPLE 7

Reaction was carried out in the same manner as in Example 6 except that 9.6 g of 2,5-diheptyl-p-xylylene dibromide was used in place of 2,5-dilauryloxy-p-xylylene dibromide to obtain a yellow precipitate. This precipitate was washed with water and methanol and then dried. It was confirmed by infrared absorption spectrum that this precipitate was poly(2,5-diheptyl-p-phenylene vinylene).

The resulting precipitate was soluble in chloroform and poly(2,5-diheptyl-p-phenylene vinylene) film was obtained by casting the chloroform solution. This film was subjected to gas phase doping at room temperature according to an ordinary method using sulfuric acid as an electron acceptor. The film showed a conductivity of $4.2 \times 10^{-3}$ S/cm in 7 hours.

EXAMPLE 8

2.5 g of 2,5-dilauryloxy-p-xylylene-bis(dimethylsulfonium bromide) was dissolved in a mixed solvent of 50 ml of methanol and 5 ml of deionized water. Thereto was added dropwise a mixed solution of 3.4 ml of 1 N aqueous sodium hydroxide solution and 10 ml of methanol over a period of 15 minutes and then was further added 50 ml of methanol, followed by stirring at 0° C.-5° C. for 30 minutes to obtain a light yellow precipitate. This precipitate was recovered and dissolved in 30 ml of chloroform and the solution was mixed with 50 ml of methanol and allowed to stand for 1 day to produce a precipitate. This precipitate was dissolved in chloroform and the solution was cast and dried in nitrogen stream to obtain a precursor film. Thermal weight change of this film was examined to find reduction in weight at 150° C.-160° C. and color of the film changed to red. Molecular species in the gas generated was analyzed by quadruple mass spectrometer, but conspicuous peak was not found at around the mass number 62 corresponding to that of dimethyl sulfide.

Elementary analysis of the resulting precursor gave the following results.

| Element | C | H | Br | S |
|---|---|---|---|---|
| Found | 78.61 | 11.45 | 0.2 | 0.13 |
| Calcd. | 78.88 | 11.55 | — | — |

Br and S of large amounts expected from sulfonium salt were not found and the results well agreed with contents of elements to be calculated from structure where methoxy group of methanol was substituted as a side chain. Infrared absorption spectrum showed an absorption attributable to methoxy group at 1100 cm$^{-1}$. Assay by gel permeation chromatography using a chloroform solution of the resulting precursor gave a weight-average molecular weight of $1 \times 10^5$ in terms of standard polystyrene.

This film was subjected to stationary heat treatment at 280° C. for 30 minutes in a nitrogen atmosphere in a horizontal tubular furnace to obtain a red poly(2,5-dilauryloxy-p-phenylene vinylene) film. Elementary analysis gave C: 81.3% (81.7%), H: 11.6% (11.5%) (parenthesized value was calculated from structural formula) which agreed with the structural formula. Furthermore, infrared absorption spectrum showed absorptions at 2900 cm$^{-1}$, 1220 cm$^{-1}$ and 970 cm$^{-1}$. These results confirmed the structure of poly(2,5-dilauryloxy-p-phenylene vinylene).

Further, this film was subjected to gas phase doping at room temperature according to an ordinary method using iodine as an electron acceptor. The film showed a conductivity of 0.9 S/cm in 4 hours. The conductivity was measured by the four-probe technique.

EXAMPLE 9

The precursor film (2 cm length ×2 cm width) obtained in Example 8 was subjected to stretching to 4 times and to stationary heat treatment at 200° C. for 30 minutes in a nitrogen atmosphere in a horizontal tubular furnace to obtain stretched poly(2,5-dilauryloxy-p-phenylene vinylene) film.

This film was subjected to gas phase doping at room temperature according to an ordinary method using iodine as an electron acceptor. The film showed a conductivity of 14.3 S/cm in 1 hour.

EXAMPLE 10

9.4 g of 2,5-diheptyloxy-p-xylylene-bis(dimethylsulfonium bromide) was dissolved in a mixed solvent of 150 ml of methanol and 10 ml of deionized water. Thereto was added dropwise a mixed solution of 15 ml of 1 N aqueous sodium hydroxide solution and 70 ml of methanol over a 25 period of 20 minutes, followed by stirring at 0° C.-5° C. for 40 minutes to obtain a light yellow precipitate. This precipitate was recovered and dissolved in 40 ml of chloroform. The solution was mixed with 80 ml of methanol and the mixture was left to stand for 8 hours to give a precipitate. This precipitate was dissolved in chloroform and the solution was cast and dried in nitrogen stream to obtain a precursor film. Thermal weight change of the film was examined to find weight reduction at 150° C.-160° C. and color of the film changed to red. Elementary analysis of this precursor film gave the following results.

| Element | C     | H     | Br    | S    |
|---------|-------|-------|-------|------|
| Found   | 77.36 | 10.52 | <0.1  | 0.15 |
| Calcd.  | 76.24 | 10.5  | —     | —    |

Br and S of large amounts expected from sulfonium salt were not found and the results well agreed with contents of elements to be calculated from the structure where methoxy group of methanol was substituted as a side chain. Infrared absorption spectrum showed an absorption attributable to methoxy group at 1100 cm$^{-1}$.

This film was subjected to stationary heat treatment at 250° C. for 30 minutes in a nitrogen atmosphere in a horizontal tubular furnace to obtain a red poly(2,5-diheptyloxy-p-phenylene vinylene) film. The structure was confirmed by elementary analysis and infrared absorption spectrum.

Further, this film was subjected to gas phase doping at room temperature according to an ordinary method using iodine as an electron acceptor. The film showed a conductivity of 15.1 S/cm in 1 hour.

EXAMPLE 11

The solution of precursor polymer in chloroform obtained in Example 10 was concentrated to 2 times at 40° C. under reduced pressure. The concentrate was slowly extruded and spun into water from a nozzle of 2 mm in diameter. The resulting filament was dried under reduced pressure and was subjected to stretching to 2.1 times simultaneously with heat treatment at 250° C. in a nitrogen atmosphere in a horizontal tubular furnace to obtain a uniaxially stretched red poly(2,5-diheptyloxy-p-phenylene vinylene) filament.

This filament was doped in sulfuric acid. The filament had a black color and showed a conductivity of 30.7 S/cm.

What is claimed is:

1. A poly(long-chain nuclear substituted p-phenylene vinylene) represented by the formula:

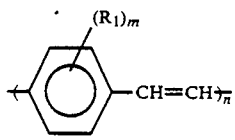

wherein $R_1$ represents a hydrogen group of 7-20 carbon atoms or an alkoxy group of 7-20 carbon atoms, n represents an integer of 5 to 50,000 and m represents 1 or 2.

2. A highly conductive composition consisting essentially of a dopant and a poly(long-chain nuclear substituted p-phenylene vinylene) represented by the formula:

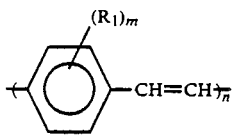

wherein $R_1$ represents a hydrogen group of 7-20 carbon atoms or an alkoxy group of 7-20 carbon atoms, n represents an integer of 5 to 50,000 and m represents 1 or 2.

3. A poly(long-chain nuclear substituted p-phenylene vinylene) according to claim 1 which is obtained by subjecting to elimination of sulfonium salt group a sulfonium salt precursor substantially represented by the formula:

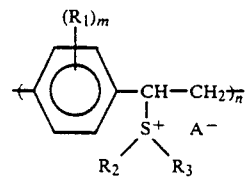

wherein $R_1$ represents a hydrocarbon group of 7-20 carbon atoms or an alkoxy group of 7-20 carbon atoms, $R_2$ and $R_3$ each represents a hydrocarbon group of 1-10 carbon atoms, n represents an integer of 5 or more, m represents 1 or 2 and $A^-$ represents a counter ion.

4. A poly(long-chain nuclear substituted p-phenylene vinylene) according to claim 1 which is obtained by subjecting to elimination of $-OR_4$ group a precursor substantially represented by the formula:

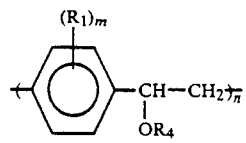

wherein $R_1$ represents a hydrocarbon group of 7-20 carbon atoms or an alkoxy group of 7-20 carbon atoms, $R_4$ represents a hydrocarbon group of 1-7 carbon atoms, n represents an integer of 5 or more and m represents 1 or 2.

5. A poly(long-chain nuclear substituted p-phenylene vinylene) according to claim 1 which is obtained by subjecting to condensation polymerization, by dehydrohalogenation, of a nuclear substituted p-xylylene dihalide represented by the formula:

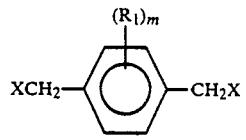

wherein $R_1$ represents a hydrocarbon group of 7-20 carbon atoms or an alkoxy group of 7-20 carbon atoms and X represents a halogen atom.

6. A poly(long-chain nuclear substituted p-phenylene vinylene) according to claim 1 which is obtained by condensation polymerization of a diphosphonium salt represented by the formula:

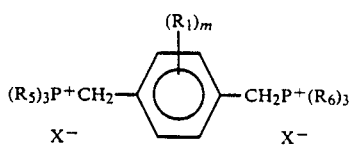

wherein $R_1$ represents a hydrocarbon group of 7-20 carbon atoms or an alkoxy group of 7-20 carbon atoms, X represents a halogen atom and $R_5$ and $R_6$ each represents a hydrocarbon group of 3-6 carbon atoms, with a dialdehyde represented by the formula:

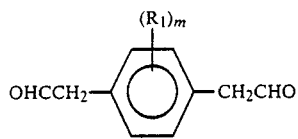

wherein $R_1$ represents a hydrocarbon group of 7-20 carbon atoms or an alkoxy group of 7-20 carbon atoms.

7. A highly conductive composition according to claim 2 which comprises, as essential components, a dopant and a poly(long-chain nuclear substituted p-phenylene vinylene) which is obtained by subjecting to elimination of sulfonium salt group a sulfonium salt precursor substantially represented by the formula:

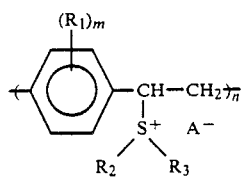

wherein $R_1$ represents a hydrocarbon group of 7-20 carbon atoms or an alkoxy group of 7-20 carbon atoms, $R_2$ and $R_3$ each represents a hydrocarbon group of 1-10 carbon atoms, n represents an integer of 2 or more, m represents 1 or 2 and $A^-$ represents a counter ion.

8. A highly conductive composition according to claim 2 which comprises, as essential components, a dopant and a poly(long-chain nuclear substituted p-phenylene vinylene) which is obtained by subjecting to elimination of $-OR_4$ group a precursor substantially represented by the formula:

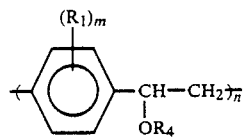

wherein $R_1$ represents a hydrocarbon group of 7-20 carbon atoms or an alkoxy group of 7-20 carbon atoms, $R_4$ represents a hydrocarbon group of 1-7 carbon atoms, n represents an integer of 5 or more and m represents 1 or 2.

9. A highly conductive composition according to claim 2 which comprises, as essential components, a dopant and a poly(long-chain nuclear substituted p-phenylene vinylene) which is obtained by condensation polymerization, by dehydrohalogenation, of nuclear substituted p-xylylene dihalide represented by the formula:

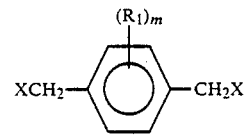

wherein $R_1$ represents a hydrocarbon group of 7-20 carbon atoms or an alkoxy group of 7-20 carbon atoms and X represents a halogen atom.

10. A highly conductive composition according to claim 2 which comprises, as essential components, a dopant and a poly(long-chain nuclear substituted p-phenylene vinylene) which is obtained by condensation polymerization of a diphosphonium salt represented by the formula:

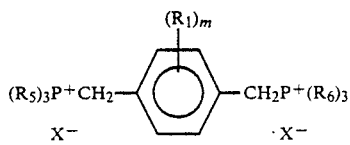

wherein $R_1$ represents a hydrocarbon group of 7-20 carbon atoms or an alkoxy group 7-20 carbon atoms, X represents a halogen atom and $R_5$ and $R_6$ each represents a hydrocarbon group of 3-6 carbon atoms, with a dialdehyde represented by the formula:

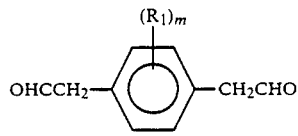

wherein $R_1$ represents a hydrocarbon group of 7-20 carbon atoms or an alkoxy group of 7-20 carbon atoms.

11. A poly(long-chain alkoxy group nuclear substituted p-phenylene vinylene) precursor represented by the formula:

wherein $R_1$ represents a hydrocarbon group of 7-20 carbon atoms or an alkoxy group of 7-20 carbon atoms, $R_4$ represents a hydrocarbon group of 1-7 carbon atoms, n represents an integer of 5 to 50,000 or more and m represents 1 or 2.

12. A highly conductive composition according to claim 2, wherein said dopant is an electron donor or electron acceptor and the amount of the dopant is 0.01 to 2.0 moles per one repeating unit of the conjugated polymer of the formula (I).

* * * * *